Feb. 26, 1935. J. R. ARMSTRONG 1,992,280
GAS METER
Original Filed July 17, 1926 3 Sheets-Sheet 1

Inventor
James R. Armstrong
By W. G. Doolittle
Attorney

Feb. 26, 1935.   J. R. ARMSTRONG   1,992,280
GAS METER
Original Filed July 17, 1926   3 Sheets-Sheet 2

Inventor
James R. Armstrong
By V. K. Doolittle
Attorney

Feb. 26, 1935.  J. R. ARMSTRONG  1,992,280
GAS METER
Original Filed July 17, 1926  3 Sheets-Sheet 3

Inventor
James R. Armstrong
By W. F. Doolittle
Attorney

Patented Feb. 26, 1935

1,992,280

UNITED STATES PATENT OFFICE 1,992,280

GAS METER

James R. Armstrong, Pittsburgh, Pa., assignor to Pittsburgh Equitable Meter Company, Pittsburgh, Pa., a corporation of Pennsylvania Application July 17, 1926, Serial No. 123,119
Renewed December 15, 1932

28 Claims. (Cl. 73—1)

My invention relates to improvements in meters, and more particularly to a closed-top gas meter comprising two pairs of measuring chambers.

An object of the present invention is to provide, in a meter of the type specified, a centrally disposed elongated cast metal structure formed with ports and passages arranged in alinement and adapted to be controlled by a pair of valves operating in alinement, whereby a relatively narrow meter structure of simple and efficient construction is produced.

Other objects of the present invention are, to provide a meter construction including an elongated ported cast metal structure in combination with sheet metal plates and parts fixedly secured to the casting and entering into the formation of the measuring chambers of the meter; and to provide a construction having a simple and efficient valve actuating mechanism; and new and improved cover supporting means.

Figure 1:
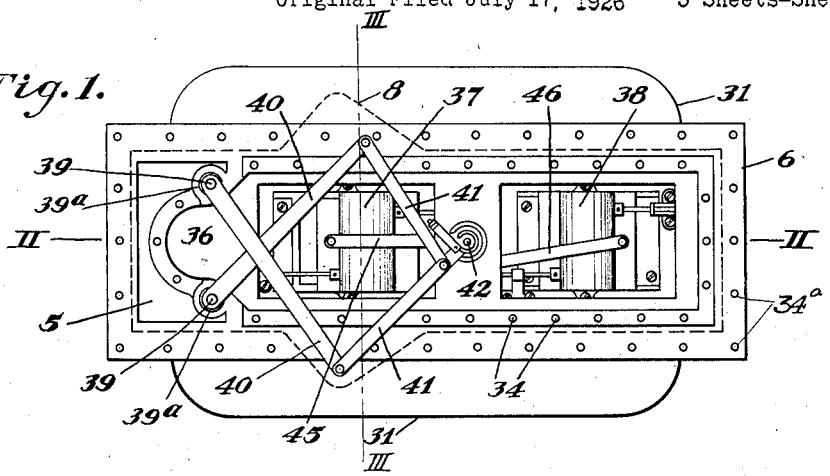
Figure 2:
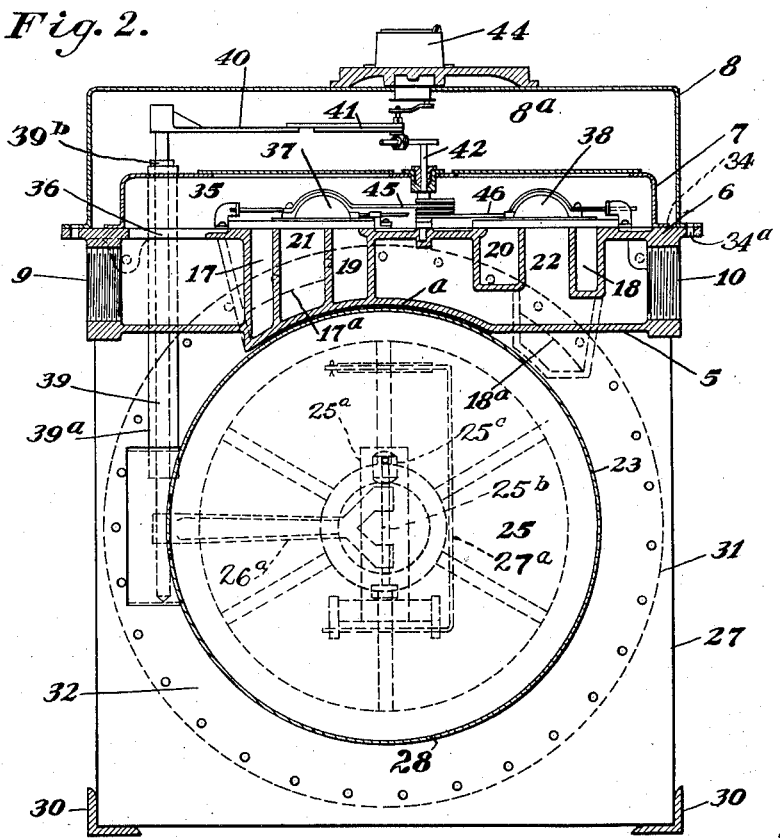
Figure 3:
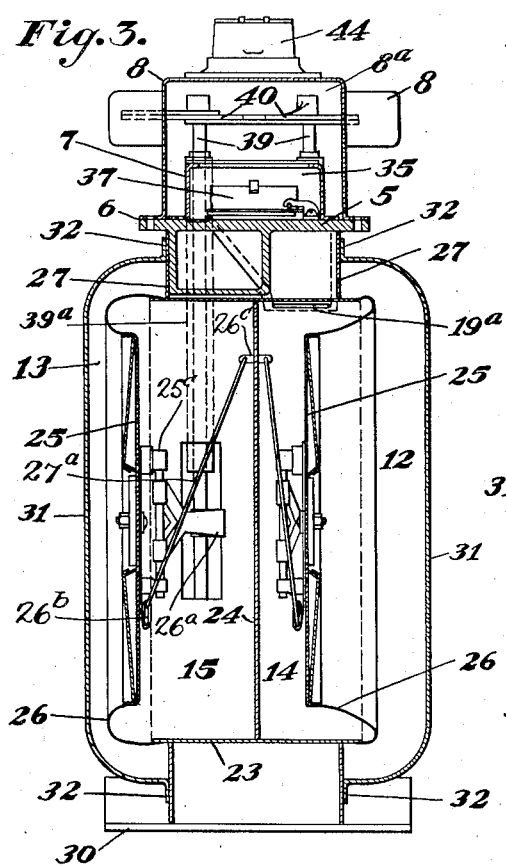
Figure 5:
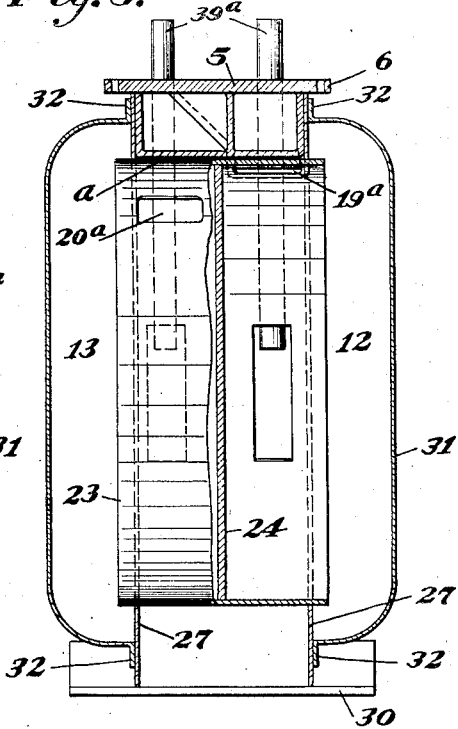
Figure 4:
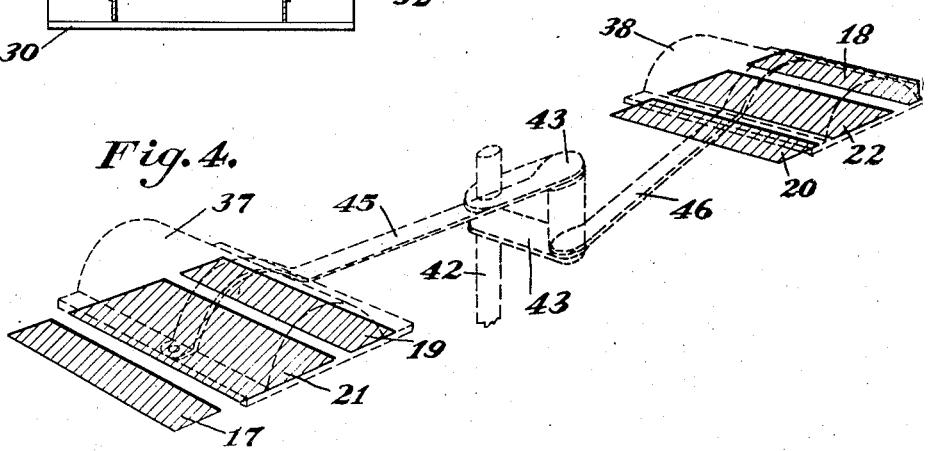
Figure 6:
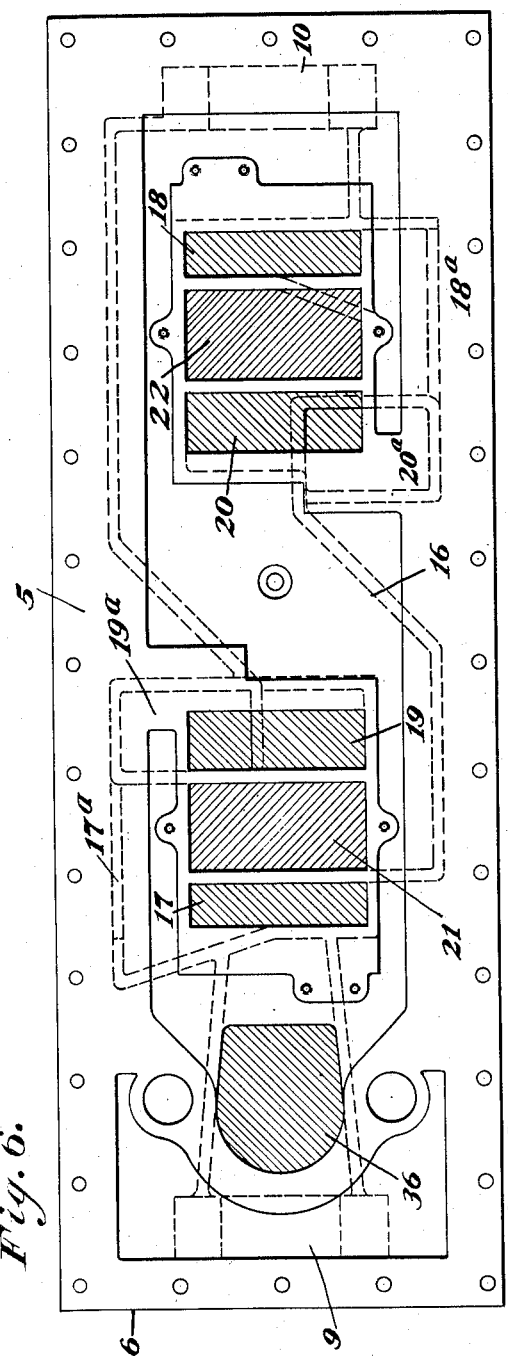
Figure 7:
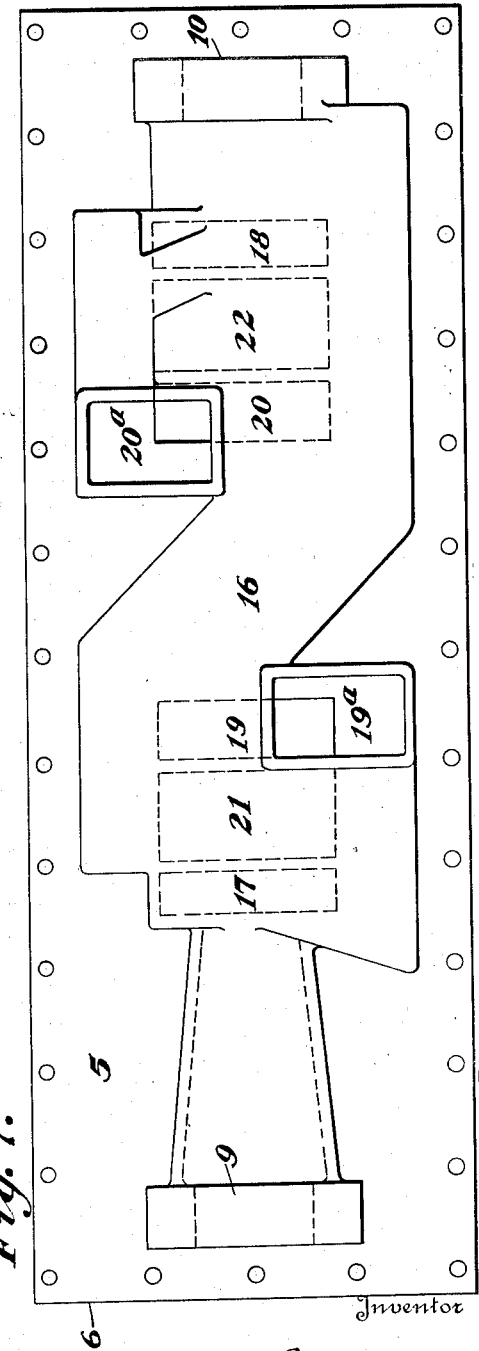

In the accompanying drawings, which illustrate an application of my invention:

Fig. 1 is a top view of a meter construction embodying my invention, with the outer and inner covers removed;

Fig. 2, a vertical sectional view of the meter, the section being taken on line II—II of Fig. 1, with the covers in place;

Fig. 3, a vertical sectional view, the section being taken at right angles to the section of Fig. 2, on the line III—III of Figure 1;

Fig. 4, a detail perspective view, showing in dotted lines two valves in alinement and means connecting the valves;

Fig. 5 is a sectional view partly in elevation similar to Figure 3 with the actuating mechanism removed for more clearly showing the construction of the measuring chambers of the meter;

Fig. 6, an enlarged top plan view, particularly showing the valve plate or head of the meter; and Fig. 7, a similar view, showing the bottom of the said valve plate or head.

As illustrated and as preferred, my improved gas meter includes two pairs of measuring means or mechanisms, each pair having a main and a supplemental chamber, one chamber of each pair being designed to fill while the other chambers are emptying. A characteristic and important feature of the present invention is a centrally disposed elongated cast metal structure having a series of ports and passages formed therein constituting a head or valve plate. This plate or structure generally is designated by the numeral 5; and, as shown, is formed with a flanged seat portion 6, which functions as a common means adapted to have attached thereto an inner valve-chamber cover 7, and a meter-casing cover or top 8 the latter being secured to seat portion 6 by bolts, screws or suitable fastening means passing through holes designated at 34a.

9 designates the inlet passage or nozzle and 10 the outlet for the gas admitted to and discharged from the meter structure, said passages being formed in the member 5. Located between the said passages 9 and 10, the structure or head 5 is formed with two sets of ports designed to communicate with two pairs of measuring chambers, including two main or outer chambers 12 and 13, and two supplemental or inner chambers 14 and 15. A passage 16 forming a communication between the two sets of ports is also formed in the structure 5. The ports of structure 5 in communication with the respective main chambers 12 and 13, and through which gas is introduced to said chambers, are designated by the numerals 17 and 18, and the ports in communication with the supplemental chambers are ports 19 and 20. 21 and 22 designate gas exhaust ports leading into the passage 16.

Secured to a curved portion a of the casting 5 by welding or otherwise, is a cylindrical member 23 having a partition 24. Member 23 with its partition enters into the formation of the supplemental measuring chambers 14 and 15. Each of these measuring chambers is of the same construction and each comprises a pan member 25 and a flexible diaphragm 26 connecting the pan 25 and the edge of the cylindrical member 23. The pan 25 has secured thereto in any suitable manner, a diaphragm carriage 25a which carries a rock shaft 25b in bearings 25c. A flag arm 26a is pivotally secured to the rock shaft 25b at one end, and at its other end is secured to flag rod 39. The diaphragm carriage 25a has an elongated U-shaped form with aligned slotted openings 26b passing through the wings of the U. A suitable bracket 26c is secured to partition 24 and a U-shaped guide rod 27a has one end passing through the aligned slotted openings 26b in the diaphragm carriage 25a and has its other end pivotally held in the bracket 26c to guide the diaphragm and diaphragm pans without canting in the operation of the meter.

The cylindrical member 23, in addition to being secured to the casting 5, is also secured to sheet metal plate members 27 having cylindrical openings 28 formed therein, into which the cylindrical member 23 is entered. Plate members 27 are welded to the casting 5, and are also welded or brazed to angle members 30 disposed at the lower portion of the meter structure.

31 designate sheet metal members or covers entering into the formation of the main measuring chambers 12 and 13. As illustrated, sheet members 31 are bulged outwardly, and are formed with engaging flanges 32, the latter being adapted to be secured to the plate members 27, or to said plates and the cast metal member 5.

The valve-chamber cover member 7 is secured to the flanged seat portion 6 by means of screws, not shown, adapted to be inserted in the screw openings 34. Cover 7, in conjunction with the valve plate or casting 5, forms a valve and gas chamber 35 in open communication with the gas inlet 9 through a port 36.

The ports above described, positioned in the casting 5 and leading to and from the respective main and supplemental measuring chambers, are controlled by pair of slide valves 37 and 38. These valves are located in the valve chamber 35 and operate by moving lineally in alinement with one another, and are designed to be moved by actuating means including the usual flag rods 39 and arms 40 secured to the upper ends of the rods 39. The arms 40 cross each other and have their opposite ends connected by links 41 to a crank shaft 42. Crank shaft 42 is provided with a two-step or double-crank structure comprising two offset crank arms 43, (see Fig. 4) one arm disposed in a horizontal plane higher than the plane in which the other arm is located.

44 designates a registering mechanism designed to be connected with the crank shaft 42. Crank arms 43 are connected with the respective slide valves 37 and 38 by connecting members 45 and 46, as particularly shown by Fig. 4.

In operation, the gas to be measured enters the passage 9 and passes therefrom into the chamber 35 through opening 36. From the said chamber 35, the gas is metered as follows. Gas enters ports 17 and 18 and passes into the outer measuring chambers 12 and 13 through openings 17a and 18a. In a similar manner, gas enters ports 19 and 20, and passes into the inner measuring chambers 14 and 15 through openings 19a and 20a.

The gas exhausts from the measuring chambers through the valves 37 and 38, into exhaust ports 21 and 22, flows through the passage 16 and passes out of the meter through passage 10.

The continuous flow of gas through the meter produces a bellows-action in the chambers. This motion is transmitted through the valves 37 and 38, the crank 42, to the registering mechanism 44.

A tube 39a surrounds each of the flag rods 39 and a packing gland 39b surrounds each rod 39 and closes the outer end of each tube 39a, and extends upwardly from one of the inner measuring chambers to a chamber 8a disposed above the valve-chamber cover 7. It will be noted that the flag rods, as well as the tubes 39a, extend for a portion of their distance outside the valve casing. The purpose of the surrounding tubes 39a is to prevent the escape of gas from the inner measuring chambers.

The construction herein shown and described including the cast metal structure 5, enables the pipes leading to and from the meter to be connected with a solid structure and one that will withstand the bending, twisting and pulling strains to which meters are subjected by the pipes to which they are connected. The construction further permits the said pipes to be connected by the meter structure in a straight line, thereby eliminating torsional stresses set up therein by expansion or contraction of the pipe line to which the meter is connected. The arrangement of the valve ports in substantially lineal relation to the pipe inlet and outlet enables the ported valve structure and meter to be made relatively narrow in relation to its length. This is a desirable feature, especially where the meters are to be used in parallel banks, in which case a considerable saving in lateral space is effected.

What I claim is:

1. In a gas meter, gas measuring chambers, an elongated ported structure having two series of alined ports in communication with the measuring chambers, a pair of valves arranged in alinement for controlling the alined ports, a valve-chamber cover, and a meter cover, both of said covers being carried by the elongated structure.

2. In a gas meter, a centrally disposed cast metal ported structure, sheet metal measuring chambers connected therewith, a cover on said structure forming a valve chamber, a casing cover, each cover having an outstanding flange, and a common means on the cast metal structure for supporting the flanges of the covers.

3. In a gas meter, a cast metal ported structure, a chamber above said ported structure, a supplemental measuring chamber below said ported structure, a valve chamber intermediate the chamber above said ported structure and said ported structure, a flag rod tube extending upwardly from said supplemental chamber to the chamber above the ported structure, and means at the upper end of said tube to cooperate with the tube for preventing the escape of gas.

4. In a gas meter, an elongated cast metal ported valve plate having a series of ports arranged in alignment, two pairs of sheet metal measuring chambers fixedly secured to the elongated valve plate, a valve chamber cover and a casing cover carried by the valve plate, each cover having an outstanding flange, said flanges being secured to said plate in a common plane.

5. In a gas meter, a centrally disposed cast metal ported structure, two pairs of sheet metal measuring chambers secured to the cast metal ported structure, a valve chamber cover and a casing cover, said valve chamber and casing covers being carried by said cast metal ported structure, and secured thereto in a common plane.

6. In a gas meter, gas measuring chambers a centrally disposed cast metal ported structure having two series of aligned ports in communication with the measuring chambers, a pair of valves arranged in alignment for controlling the aligned ports, a valve chamber cover and meter cover both of said covers being carried by the cast metal structure.

7. In a gas meter, a cast metal ported structure, a chamber above said structure, a supplemental measuring chamber, an intermediate valve chamber, a flag rod extending upwardly from the supplemental chamber to the chamber above the ported structure and means surrounding said flag rod, for preventing the escape of gases, said means comprising a tube and packing gland.

8. In a gas meter enclosing gas measuring chambers an elongated cast metal structure over the chambers, which structure is formed with aligned ports communicating with said chambers; aligned valves controlling said ports; said structure being formed with threaded passages in alignment with said ports, adapted to detachably receive a gas line; the aligned ports, valves and passages lying substantially in the longitudinal axis of said elongated structure.

9. In a gas meter formed with gas measuring chambers an elongated cast metal structure having an inlet passage and an outlet passage, said structure being disposed over said chambers, a cover supported by said structure and defining therewith a valve chamber; said structure being formed with aligned ports in communication with said measuring chambers and the valve chamber; aligned valves controlling said ports; said elongated structure containing a port in communication with the valve chamber and said inlet passage, and other aligned ports; the said structure being also formed with a passage in communication with the last named aligned ports and the outlet passage.

10. In a gas meter, gas measuring chambers; an elongated cast metal structure disposed over said chambers and provided with alined ports in communication therewith; a cover supported by said structure and defining therewith a valve chamber with which said ports are in communication; alined valves in said valve chamber controlling said ports; a second cover supported by said structure surrounding said first cover in spaced relation thereto; a crank shaft rotatably supported by said structure and said first cover; operative connections between said crank shaft and said valves in said valve chamber; flag rods extending upwardly from said measuring chambers into the space between said covers; and operative connections in said space between said flag rods and said crank shaft.

11. In a gas meter, a cylindrical member provided with a centrally disposed partition; an elongated cast metal structure supported on said cylindrical member; plates disposed over said cylindrical member and engaging opposite sides of said structure; diaphragm structures secured to opposite ends of said cylindrical member defining therewith inner measuring chambers; sheet metal members secured to said plates defining therewith and with said diaphragm structures outer measuring chambers; a cover supported on said structure defining therewith a valve chamber; there being alined ports in said structure in communication with said measuring chambers and said valve chamber; and alined valves in said valve chamber controlling said ports.

12. A gas meter comprising a pressed steel cylinder provided with a partition, diaphragms secured to the ends of said cylinder; plates supporting said cylinder; covers secured to said plates; the partition, diaphragms and covers providing inner and outer gas measuring chambers; a valve plate casting supported above said cylinder and provided with gas passages in communication with said inner and outer measuring chambers; valves cooperating with said passages adapted to control the flow of gas there through; and means connecting said diaphragms with the valves whereby the movements of the diaphragms in response to gas pressures are transmitted to said valves.

13. A gas meter comprising a pressed steel cylinder provided with a centrally disposed partition; diaphragms secured to the ends of said cylinder; centrally apertured plates surrounding said cylinder and providing supporting means therefor; members secured to said plates forming covers for said cylinder; said partition and diaphragms providing a pair of inner gas measuring chambers and said diaphragms and members providing a pair of outer gas measuring chambers; a valve plate casting supported between said plates provided with inlet and outlet gas passages and intermediate gas passages certain of which are in communication with said inner measuring chambers and others in communication with said outer measuring chambers; sliding valves associated with said casting and co-operating with said intermediate passages adapted to control the flow of gas through said intermediate passages and said inner and outer measuring chambers; rods rotatably supported in said casting and projecting inward and outward thereof; means connecting the inner ends of said rods with said diaphragms; and means connecting the outer ends of said rods with said valves, whereby the movements of said diaphragms in response to gas pressures are transmitted to said valves.

14. A gas meter containing gas measuring chambers; an elongated member disposed over said chambers; said member being formed with aligned ports in communication with said chambers; aligned valves controlling said ports; flag rods extending outwardly from said measuring chambers through said member adjacent one end thereof; a crank shaft rotatably supported by said member; and a flexible operating connection between said rods, said shaft and said valves.

15. The combination defined in claim 14 in which said flexible operating connections comprise intersecting arms having one set of ends thereof secured to said rods, links having adjacent ends pivotally secured to the opposite ends of said arms, the opposite ends of said links pivotally secured to said crank shaft, and connecting members operatively connected with said shaft and said valves.

16. In a gas meter, an elongated ported structure; gas measuring chambers in communication with the ports in said structure; aligned sliding valves controlling said ports; a crank shaft rotatably supported by said structure; offset crank arms carried by said shaft; links pivotally connected at opposite ends thereof to said valves and said crank arms; flag rods projecting upwardly from said measuring chambers through said structure; and flexible connections between the outer ends of said rods and said crank shaft.

17. The structure defined in claim 16 in which said flexible connections comprise laterally movable arms one set of ends of which are secured to said rods; and links pivotally secured to the opposite ends of said arms and said shaft.

18. In a gas meter, a pressed steel cylindrical member provided with a centrally disposed partition; diaphragms secured to the ends of said member defining with said partition inner measuring chambers; plates surrounding and supporting said member; covers secured to said plates defining therewith and with said diaphragms outer measuring chambers; an elongated cast metal structure provided with an inner curved seat which engages and is secured to said member; said structure provided with alined ports communicating with said chambers; and sliding valves controlling said ports.

19. A gas meter comprising gas measuring chambers; an elongated structure supported on said chambers and provided with ports in communication therewith; valves controlling said ports; a cover detachably secured to said structure and housing said valves; flag rods projecting upwardly from said chambers through said structure and said cover; a crank shaft journaled in said structure and said cover and projecting outwardly of said cover; connections between said shaft and said valves within said cover; a second cover detachably secured to said structure; and connections between said rods and said shaft within said cover.

20. A gas meter comprising an elongated ported structure provided with an inner curved seat; a cylindrical pressed steel member engaging and secured to said seat; plates surrounding said member and secured thereto and to said structure; angle members secured to the inner ends of said plates; and covers secured to said plates.

21. A gas meter comprising a cylinder provided with a centrally disposed partition; diaphragms secured to the ends of said cylinder; centrally apertured plates surrounding said cylinder and projecting laterally of the axis thereof and providing supporting means for the meter; covers secured to said plates; a valve plate casting having an inner curved seat supported on and receiving a portion of said cylinder and disposed between said plates; inner and outer covers secured to the top of said casting; sliding valves supported on said casting within said inner cover; tubular casings vertically supported in said casting; flag rods rotatably supported in said casings and projecting beyond the ends thereof; brackets carried by said diaphragms; arms connecting said brackets with the inner ends of said flag rods; a crank structure journaled in said casting and inner cover; a linkage connection within said outer cover between the outer ends of said flag rods and the crank structure; and means connecting said crank structure with the valves.

22. A gas meter comprising an elongated cast metal ported structure; a plate secured to each side of said structure; a cylindrical member below said structure and extending through said plates and covers detachably secured to said plates and enclosing said cylindrical members.

23. In a fluid meter, an open ended hollow cylinder structure having a partition intermediate the ends thereof to form adjacent fluid measuring chambers, plate members having holes formed therein through which project the open ends of said cylinder and to which said cylinder is secured, diaphragms closing the cylinder ends, a ported structure interposed between said plate members to which said plate members are secured, and covers secured to said plate members to form main measuring chambers.

24. In a fluid meter, an open ended hollow cylinder structure having a partition intermediate the ends thereof to form adjacent gas measuring chambers, plate members secured to said cylinder having holes formed in alignment with said cylinder, diaphragms closing the cylinder ends, a ported structure interposed between said plate members to which said plate members are secured, auxiliary supporting means secured to said plate members, and covers secured to said plate members to form main measuring chambers.

25. A fluid meter comprising a pair of adjacent open ended measuring chambers having a common partition wall, diaphragm members across the open ends of the measuring chambers, flanges extending from the periphery of the measuring chambers and welded thereto, a ported structure independent of and secured between said flanges and having ports in communication with said measuring chambers, and covers secured to said flanges to form additional measuring chambers.

26. In a fluid meter, gas measuring chambers, a ported structure having inlet and outlet passages substantially longitudinally aligned and adapted to be connected to a pipe line and forming a continuation thereof, said structure having valve ports communicating with said gas measuring chambers, said valve ports being substantially in alignment longitudinal with said inlet and outlet passages and longitudinally aligned reciprocating valves associated with said valve ports and arranged to reciprocate substantially in the line of alignment.

27. A gas meter comprising a cylinder provided with a centrally disposed partition; centrally apertured plates surrounding said cylinder and projecting laterally of the axis thereof; an elongated ported valve body casting secured between said plates; covers secured to said plates; flag rods extending from said diaphragms into said valve body at one end thereof; connecting links secured to said flag rods and to a central crank member; slide valves longitudinally aligned in said ported body; connecting links between said crank and slide valves; said ported structure having inlet and outlet passages substantially longitudinally aligned and adapted to be connected to a pipe line and form a continuation thereof, and longitudinally aligned with said slide valves.

28. A gas meter comprising a cylindrical member having outwardly extending ends and provided with a partition, diaphragms secured to said extended ends; plates supporting said cylindrical member; covers secured to said plates; said partition, diaphragms and covers providing a plurality of measuring chambers; an elongated member disposed between said plates above said cylindrical member and provided with gas passages and ports in communication with said measuring chambers, valves carried by said elongated member and means operatively connecting said valves, with said diaphragms controlling the flow of gas into said measuring chambers.

JAMES R. ARMSTRONG.